(12) United States Patent
Lehrman et al.

(10) Patent No.: US 9,058,327 B1
(45) Date of Patent: Jun. 16, 2015

(54) ENHANCING TRAINING OF PREDICTIVE CODING SYSTEMS THROUGH USER SELECTED TEXT

(75) Inventors: Gary Lehrman, Cupertino, CA (US); Venkat Rangan, Los Altos Hills, CA (US); Nelson Wiggins, San Jose, CA (US); Malay Desai, Los Altos, CA (US)

(73) Assignee: Symantec Corporation, Mountain View, CA (US)

( * ) Notice: Subject to any disclaimer, the term of this patent is extended or adjusted under 35 U.S.C. 154(b) by 456 days.

(21) Appl. No.: 13/474,602

(22) Filed: May 17, 2012

Related U.S. Application Data

(60) Provisional application No. 61/590,786, filed on Jan. 25, 2012.

(51) Int. Cl.
*G06F 15/18* (2006.01)
*G06F 17/30* (2006.01)

(52) U.S. Cl.
CPC .............................. *G06F 17/30011* (2013.01)

(58) Field of Classification Search
None
See application file for complete search history.

(56) References Cited

U.S. PATENT DOCUMENTS

| | | | |
|---|---|---|---|
| 7,933,859 B1* | 4/2011 | Puzicha et al. | 706/62 |
| 8,533,194 B1* | 9/2013 | Ravid et al. | 707/737 |
| 2010/0299328 A1* | 11/2010 | Pachet | 707/736 |

OTHER PUBLICATIONS

U.S. Appl. No. 13/843,501, filed Mar. 15, 2013.
U.S. Appl. No. 13/421,226, filed Mar. 15, 2012.
U.S. Appl. No. 13/729,743, filed Dec. 28, 2012.

\* cited by examiner

*Primary Examiner* — Kakali Chaki
*Assistant Examiner* — Michael Zidanic
(74) *Attorney, Agent, or Firm* — Lowenstein Sandler LLP

(57) ABSTRACT

An exemplary predictive coding system can be programmed to update a plurality of training documents based on a portion of a training document selected by a user. The predictive coding system generates a machine learning engine based on the updated plurality of training documents. The predictive coding system predicts a classification for one or more remaining documents from the plurality of training documents using the machine learning engine.

18 Claims, 13 Drawing Sheets

ENHANCING TRAINING OF PREDICTIVE CODING SYSTEMS THROUGH USER SELECTED TEXT

RELATED APPLICATIONS

This application is related to and claims the benefit of U.S. Provisional Patent application Ser. No. 61/590,786, filed Jan. 25, 2012, which is hereby incorporated by reference.

TECHNICAL FIELD

Embodiments of the present invention relate to electronic discovery, and more particularly, to a technique for enhancing training of predictive coding systems through user selected text and/or attributes.

BACKGROUND

Reviewers that review data sets, for example, during electronic discovery (e-discovery), may encounter data sets that contain millions of electronic discovery documents. Each of the electronic discovery documents may need to be evaluated by the reviewers and a determination may be made of a class or category for the documents. Categories may include confidential, not confidential, relevant, not relevant, privileged, not privileged, responsive, not responsive, etc. Manually reviewing the millions of electronic discovery documents is impractical, expensive, and time consuming.

Automated predictive coding using machine learning is a technique commonly implemented to review and classify a large number of electronic discovery documents. Some approaches of machine learning can use Support Vector Machine (SVM) technology to analyze a subset of the electronic discovery documents, called a training set, and can apply the machine learning from the analysis to the remaining electronic discovery documents. Some approaches can use more than one training set for machine learning and/or can perform more than one round of machine learning (train, test, train, etc.).

A SVM can be based on the concept of decision planes that define decision boundaries. A decision plane can separate documents based on their class memberships (e.g., confidential, not confidential, relevant, not relevant, privileged, not privileged, responsive, not responsive, etc.). For example, documents can be classified by drawing a line that defines a class boundary. On a first side of the boundary, all documents belonging to a first class (e.g., confidential) lie and on a second side of the boundary, all documents belonging to a second class (e.g., not confidential) lie. After the training phase is completed, new documents that were not part of the training set can be automatically classified. Any unclassified document can be classified by determining which side of the boundary it falls on. If the document falls to the first side, it can be classified as belonging to the first group, and if the document falls to the second side, it can be classified as belonging to the second group.

When creating or evaluating the training set of documents, a reviewer may classify (or mark, tag, code, etc.) an electronic discovery document based on metadata of the electronic discovery document and/or the content of the electronic discovery document. In the case of email documents, metadata can include one or more senders or recipients, a date of the email document, and a subject of the email document. Content of an email document can include the body content of the email and any attachments. In the case of other documents, metadata may include the author of the document, the name of the document, the last modified time, the creation time etc.

Once the reviewer has classified the electronic discovery document, the reviewer may associate a code or tag with the document specifying the class or category (e.g., classified, relevant, etc.). The degree of a reviewer's textual examination for classification of an electronic discovery document may vary widely depending upon the reviewer and the purpose of the review. For example, a reviewer who is an opposing counsel may classify a document based solely on the presence of certain search terms specified by the opposing counsel. In contrast, a reviewer who is an internal counsel may classify a document based on the counsel's perceived issues of the case or investigation, thereby requiring a more detailed examination of the document text.

A current approach can use semantic recognition to classify documents. Semantic recognition recognizes semantic correlation between one or more documents or passages of documents. Some semantic recognition systems use a technique called Latent Semantic Analysis ("LSA") (also called Latent Semantic Indexing). LSA expresses a corpus of documents as a matrix of terms and documents, or other appropriate lexical divisions such as paragraphs, where each cell contains the number of occurrences of a term in a document. The matrix may often be reduced to one in which only the most frequently found terms appear. After this, other documents may be compared to this corpus using matrix algebra. For example, in a grading system, training documents considered excellent (i.e. "A" papers) may be entered into the system to train the system. Once the training has been performed, other documents may be provided to the system and the system may automatically grade these documents such that documents exhibiting very high correlation with the training documents might be graded as "A" papers and documents exhibiting a lower correlation with training documents might be given lower grades.

Another current approach may allow a reviewer to associate a tag or code with an entire electronic discovery document. The reviewer can scan the document for relevant issues, and upon identifying relevant text, can associate the document with the corresponding tag or code. For example, an entire document can be classified as "Confidential." Using this approach, when the SVM engine builds a classifier, it must use all the content of each training document. Furthermore, when predicting the class of documents that are not in the training set, the predictive coding system uses all the content of each training document to determine the classification of the remaining documents.

A system that considers the entire document for training and prediction purposes may often produce inferior classification results. This can be especially true when the training document is large and the content covers several themes or concepts, and the theme that is critical for classification is dominated by other content within that document.

To try to identify the relevant text in the document, current approaches to a predictive coding system may focus on paragraphs containing search term hits if the document was found by way of a key term search, the system, as these paragraphs were most likely to receive reviewer attention. A list of paragraphs for a code applied to the document can be built, the paragraphs being ordered by the number or density of term hits. The paragraphs in subsequent documents can then be tested for closeness (typically using various geometric measures of vector distance) to the paragraphs at the top of the list. A paragraph vector measured to be within a given threshold to a paragraph with sufficient search term presence may suggest that the paragraph should be coded in the same manner.

Another approach to identify relevant text in a document used to classify the document may use clustering. Clustering may measure the distance between each paragraph in the list of those found in documents assigned a particular classification. Over the course of several documents marked with the same classification, one or more sets of paragraphs that are relatively closer to each other than the norm may be found. The predictive coding system may determine that these clusters of paragraphs are the more significant paragraphs of the marked documents. Large clusters of paragraphs may be given greater weight than smaller clusters. Clustering may be represented by a single "best-fit" vector, such that paragraphs of an unclassified document may need to be measured against a single vector to determine correlation with the cluster and its associated tag. However, the clusters and "best-fit" vectors must be recalculated with the addition of newly coded documents to the training model. Initially, with few documents in the model, this should be fast. However, as more documents are coded and added to the model, cluster calculation will require more processing, and additional documents may make little difference in the model.

An additional approach may combine search term hits with clustering, such that greater weight may be given to clusters with more term hits. Moreover, the predictive coding system may weight paragraphs in terms of the document proportion they represent. For example, a single paragraph of a document with a total of three paragraphs may be given a greater weight than a single paragraph of a document with a total of twenty paragraphs.

SUMMARY

An exemplary predictive coding system can be programmed to update a plurality of training documents based on a portion of a training document selected by a user. The predictive coding system generates a machine learning engine based on the updated plurality of training documents. The predictive coding system predicts a classification for one or more remaining documents from the plurality of training documents using the machine learning engine.

In one embodiment, the predictive coding system presents the plurality of training documents to the user, presents a selection tool to the user, wherein the user can select the portion of the training document and a training classification using the selection tool, and associates the training classification with the portion of the training document.

In one embodiment, the predictive coding system updates the at least one training document by creating a new training document comprising the portion of the training document selected by the user, associating the training classification with the new training document, and including the new training document in the plurality of training documents.

In one embodiment, the predictive coding system receives a marking from the selection tool, and determines that the portion of the training document is a positive contribution to the training classification when the marking is positive and determines that the portion of the training document is a negative contribution to the training classification when the marking is negative.

In one embodiment, the predictive coding system further determines a plurality of additional documents to present to the user and modifies the updated plurality of training documents based on user input for the plurality of additional documents.

In one embodiment, the predictive coding system predicts a classification for the plurality of remaining documents using the machine learning engine by generating a search query using the machine learning engine, performing a search on the plurality of remaining documents using the search query, determining a probability measure for each of the plurality of remaining documents, and selecting a classification for each remaining document in the plurality of remaining documents based on the probability measure. In one embodiment, the probability measure is determined using a result of the search. In one embodiment, the selected classification comprises a probability measure that is greater than a predetermined threshold. In one embodiment, the search query includes information to account for one or more variations in text associated with the portion of the training document selected by the user.

In one embodiment, the predictive coding system determines one or more exemplar documents used by the predictive coding system to determine a classification for a prediction document in the plurality of remaining documents and identifies one or more selected regions used by the predictive coding system to determine the classification for the prediction document in the plurality of remaining documents.

BRIEF DESCRIPTION OF THE DRAWINGS

Various embodiments of the present invention will be understood more fully from the detailed description given below and from the accompanying drawings of various embodiments of the invention.

FIGS. 6A-6D are exemplary user interfaces providing a selection tool for a predictive coding system, according to some embodiments.

DETAILED DESCRIPTION

Figure 1:
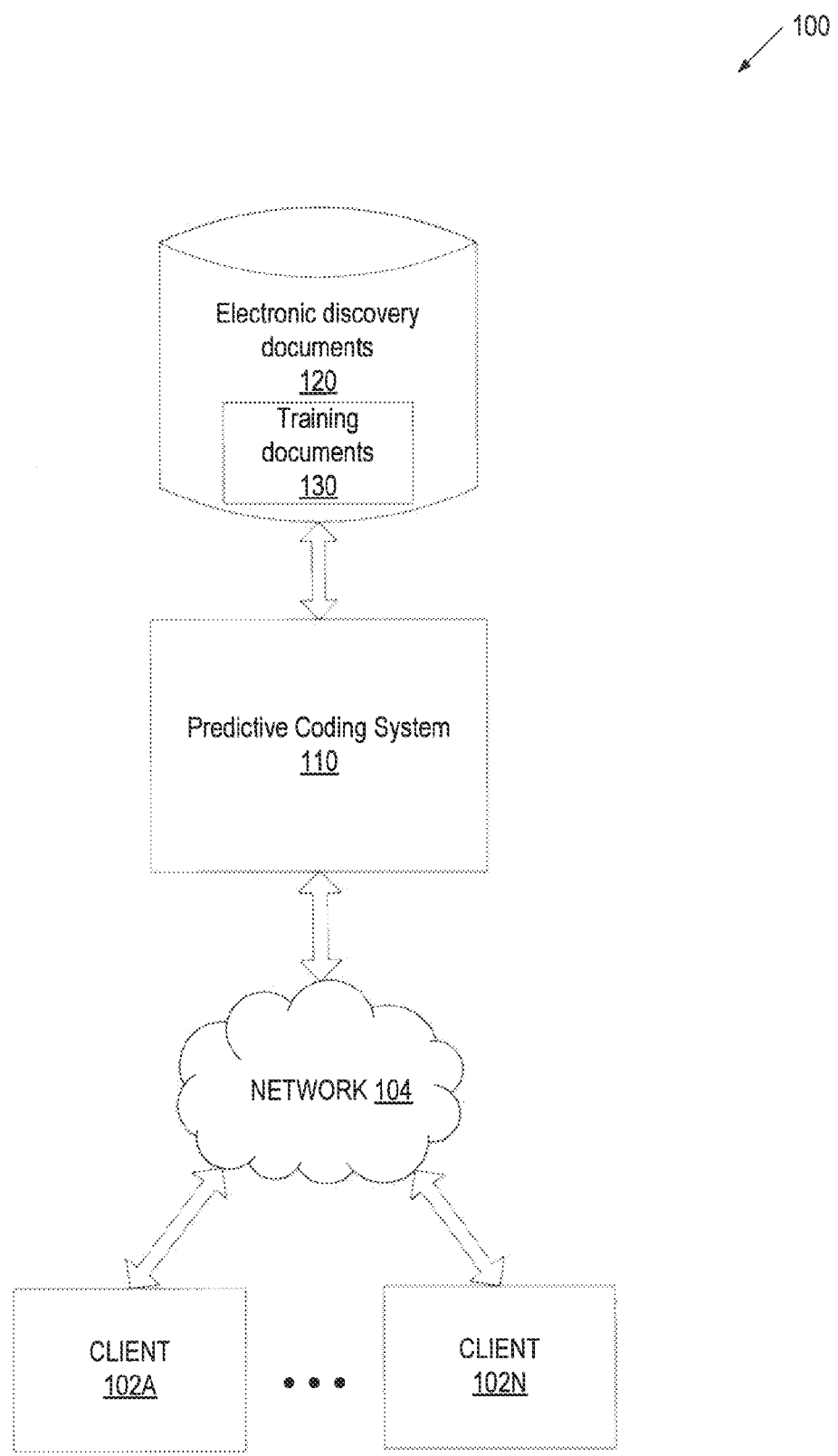
FIG. 1 illustrates an exemplary system architecture for the implementation of a prediction system, in accordance with various embodiments of the present invention.

Embodiments of the invention are directed to a method and system for enhancing training of predictive coding systems through user selected text.

Reviewers or administrators may have millions of electronic discovery documents to review in relation to electronic discovery. Automated predictive coding using machine learning can be used to assist in reviewing and classifying a large number of electronic discovery documents. In order to classify a large number of electronic discovery documents, a subset of the electronic discovery documents (e.g., 1000 to 10000 documents) may be selected as a set of training documents for the machine learning. The training documents may be reviewed by reviewers and categorized into one or more classes.

When evaluating the set of training documents, a reviewer may classify an electronic discovery document based on various text and/or attributes (e.g., metadata, date of creation, author, or document type, etc.) of the training documents. The user can use a selection tool (e.g., presented in a user interface) to select the text and/or attributes of one or more of the training documents that were used by the user in making the classification. The user can mark the selected text and/or attributes as having a positive contribution to the classification or as having a negative contribution to the classification.

Making the classification may require the user to assign a tag or class to the selected text and/or attributes. By providing the selection tool, the user can narrow the scope of the text and/or attributes that are associated with the user-specified classification. The selected text and/or attributes can be used to create or update training documents for machine learning.

Once the training documents are created or updated, documents outside the training documents can be analyzed, and documents that are near duplicates of a training document can be automatically selected. A near duplicate document is a document that is almost a duplicate of the training document (e.g., nearly identical). The near duplicate documents, with corresponding markings (e.g., responsive, not responsive, etc.) generated using the training document markings, may be presented to a user in a user interface for analysis by the user. For example, a user marks training document X as "responsive" and selects text and/or attributes that contributed to the marking. If a document Y is found to be a near duplicate of training document X, the document Y, the "responsive" marking for the document Y, and a selection of text and/or attributes that contributed to the marking are presented to the user for analysis in a user interface. The "responsive" marking can be presented to the user, as well as the portion(s) of document Y that influenced the classification. The user interface may further allow the user to keep the corresponding markings or abandon the markings. If the user disagrees with the marking provided for a document, the user can abandon or remove a marking presented in the user interface. For example, if the user does not agree that document Y should have a "responsive" marking, the user can remove the "responsive" marking, and either add another marking, such as "not responsive" or allow the document Y to not have a marking. The user interface may further allow the user to mark the near-duplicate documents using the selection tool. The near-duplicate documents may be included in the training documents upon user analysis of the near-duplicate documents.

Once the training documents have been created and/or updated, and the near-duplicate documents may have been presented and marked by a user, the training set is appropriately established. Using the appropriately established training set, the predictive coding system builds a model with consideration of the text and/or attribute selections. The predictive coding system gives special weights and considerations to the selected text and/or attributes. Once the model is built, the remaining electronic documents (outside of the training set) can be provided to the machine learning engine, and classifications for each of the remaining electronic documents can be provided by the machine learning engine.

The provided classification of the remaining electronic documents is performed such that similarities to previously reviewed documents and decisions made about those documents may be detected and presented based on the selected text and/or attributes that the user has identified as being relevant to a particular classification. Moreover, capturing the correspondence between particular document text and a classification may lead to improved similarity detection and suggestion accuracy, as well as enhanced review capabilities.

The predictive coding system may further justify coding suggestions based on selecting exemplars and portions of previously marked text that most influence automatic suggestions. The aspects, text, and/or attributes that contribute to a given classification or prediction can be presented to a user (e.g., in the user interface, in a report, etc.) such that the user can see what contributed to the particular coding suggestion provided by the system.

For a legal review that uncovers issues and references to these issues, the selection tool can be used to identify and highlight these references. Moreover, the selection tool may create a very detailed audit trail. After saving text selections in a database along with user, document, and classification, personnel conducting quality assurance would be able to see exactly why, in terms of document text, a reviewer assigned a particular classification to the document.

A further advantage of the selection tool may be that users can see exactly which aspects, text, and/or attributes of the training documents have been correlated with a particular tag or code, providing transparency into the coding process. Such transparency may justify tagging decisions going forward and also may provide helpful information for training and audit purposes.

FIG. 1 illustrates exemplary system architecture 100 in which embodiments can be implemented. The system architecture 100 includes a predictive coding system 110, an electronic discovery documents data repository 120, and client machines 102A-102N connected to a network 104. Network 104 may be may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

Predictive coding system 110 may be a rackmount server, a router computer, a personal computer, a portable digital assistant, a mobile phone, a laptop computer, a tablet computer, a camera, a video camera, a netbook, a desktop computer, a media center, or any combination of the above. In one embodiment, the predictive coding system 110 is deployed as a network appliance (e.g., a network router, hub, or managed switch).

Electronic discovery documents data repository 120 is a persistent storage that is capable of storing data that is collected from data sources. Examples of data sources can include, and are not limited to, desktop computers, laptop computers, handheld computers, server computers, gateway computers, mobile communications devices, cell phones, smart phones, or similar computing device. In some embodiments, electronic discovery documents data repository 120 might be a network-attached file server, while in other embodiments electronic discovery documents data repository 120 might be some other type of persistent storage such as an object-oriented database, a relational database, and so forth.

The data in the electronic discovery documents data repository 120 can include electronic discovery documents that need to be reviewed and classified. Examples of electronic discovery documents can include, and are not limited to, electronic discovery documents which have been divided into a set of training documents that have been selected by an administrator (document reviewer, etc), portions of training documents that have been selected by an administrator and classified by the administrator, a remainder of electronic discovery documents that need to be classified, and any other electronically stored information that can be associated with electronic discovery documents, etc.

The client machines 102A-102N may be personal computers (PC), laptops, mobile phones, tablet computers, or any other computing devices. The client machines 102A-102N may run an operating system (OS) that manages hardware and software of the client machines 102A-102N. A user interface (not shown) may run on the client machines (e.g., on the OS of the client machines). The user interface may present documents from electronic discovery documents 160 or training documents 170. The user interface may further present a selection tool for a user to select one or more portions of text and/or attributes of the presented documents. The user interface can present classifications for documents in electronic discovery documents 160, and justifications for those classifications. The client machines 102A-102N may also upload new training documents, updated training documents, selected portions of training documents, and updated classifications to the predictive coding system 110 for storage and/or classification (e.g., in electronic discovery documents 120).

During operation of system 100, a user interface can be presented to an administrator or reviewer via client device 102A-102N. The user interface can present one or more training documents from training documents 130 on the client device 102A-102N over network 104. The user interface can allow the user to classify each document presented (e.g., confidential, not confidential, relevant, not relevant, privileged, not privileged, responsive, not responsive, etc.), as well as a selection tool to allow the administrator or reviewer to select portions of the document that was used to determine the classification.

The predictive coding system 110 receives the classification and selected portions from the client device 102A-102N via network 104. In some embodiments, the predictive coding system 110 updates the training documents 130 using the selected portions. The predictive coding system 110 uses the classification and selected portions to classify the remaining electronic discovery documents in electronic discovery documents data repository 120. The predictive coding system 110 can present the classification results for the remaining electronic discovery documents to the administrator or reviewer via client device 102A-102N over network 104.

The predictive coding system 110 can present, via a user interface on client device 102A-102N, justifications for the coding suggestions or decisions to the administrator or reviewer. The predictive coding system 110 can provide the aspects, text, and/or attributes that contribute to a given classification or prediction to client 102A-102N via network 104 to be included in the user interface.

Figure 2:
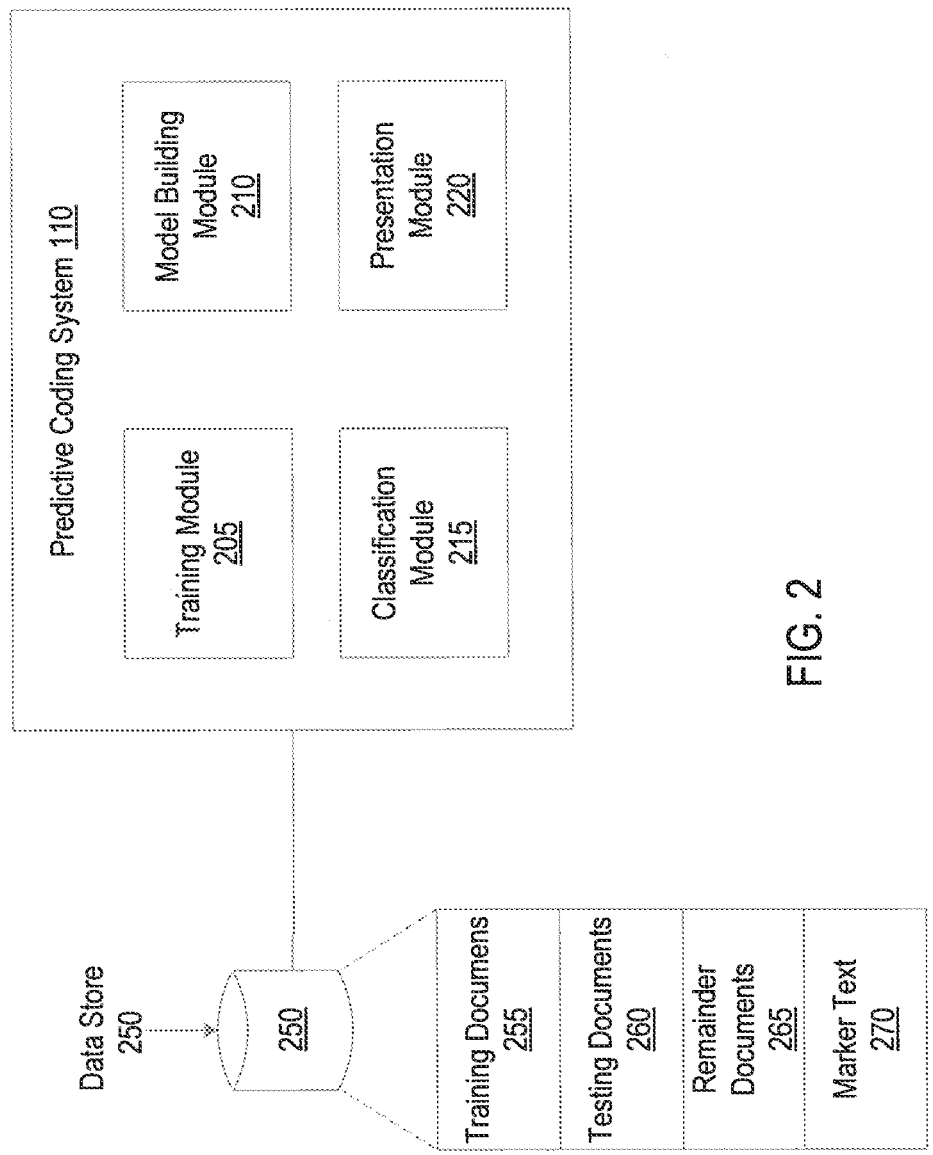
FIG. 2 is a block diagram of a prediction system, in accordance with an embodiment of the present invention.

FIG. 2 is a block diagram of a predictive coding system 110, in accordance with one embodiment of the present invention. The predictive coding system 110 includes a training module 205, a support vector machine 210, a classification module 215, and a presentation module 220. Note that in alternative embodiments, the functionality of one or more of the training module 205, the support vector machine 210, the classification module 215, and the presentation module 220 may be combined or divided.

Training module 205 can provide one or more training documents 255 to presentation module 220 to present to a user. Training module 205 can obtain the portions (e.g., text, attributes, etc.) of training documents 255 that were used by an administrator or reviewer to classify the training documents 255, as well as a classification for the training documents 205. Training module 205 can identify the portions of the training documents that were used by an administrator or reviewer to classify the training documents 255 by determining which portions of the training documents were selected by the administrator or reviewer using a selection tool.

Training module 205 can associate the portions of the training documents with the user-specified classification. Training module 205 can create new training documents to store into training documents 255 or update the existing training documents in training documents 255 to using the selected portions, as well as the user-specified classification. In one embodiment, training module 205 can create a new training document for the selected portions for a training document and the associated classification. In an alternate embodiment, training module 205 can update an existing training document in training document 255 to include only the selected portions for that document, along with the associated classification. Training module 205 an store the new and/or updated training documents in training documents 255.

In one embodiment, training module 205 identifies one or more testing documents based on training documents 255. In one embodiment, training module 205 identifies testing documents by submitting training documents 255 and remainder documents 265 to a near duplicate engine (not shown) and/or a concept cluster engine (not shown), and receiving testing documents from the engine(s). In an alternate embodiment, training module 205 identifies the testing documents by evaluating each training document 255 to determine whether any of remainder documents 265 are similar to the training document 255. In this embodiment, training module 205 can map the training documents 255, which are categorized by the reviewers to pre-defined classes (e.g., privileged, responsive, confidential, relevant, etc.), into a feature vector space. Training module 205 can map the training documents 255 into the feature vector space by extracting one or more features from each training document 255 and assigning identifiers to the features in a feature vector. Once all of the training documents have been mapped to a feature vector, training module 205 can send the feature vectors for the training documents to a near duplicate engine (not shown) and/or a concept cluster engine (not shown), and receive testing documents from the engine(s) based on the feature vectors. In one embodiment, training module 205 can store the determined testing documents in testing documents 260.

In one embodiment, training module 205 analyzes testing documents 260 to determine whether any of the documents in testing documents 260 include one or more of the selected portions of training documents 255. If the documents in testing documents 260 include one or more of the selected portions, training module 205 can automatically select the selected portions in the documents, and provide the selected portions and the corresponding documents in testing documents 260 to presentation module 220 for presentation to the administrator or reviewer. In one embodiment, training module 205 updates the training documents 255 to include the documents in testing documents 260 that include one or more of the selected portions. In an alternate embodiment, training module 205 updates the training documents 255 to include the documents received from presentation module 220.

Model building module 210 can analyze each training document in training documents 255 to generate marker text and build a model based on the marker text. Model building module 210 can consider each document in training documents 255 as a collection of regions. Model building module 210 can analyze the text in each region to create tokens. Each token is a word or a string of text that is likely found as a unit in both the training documents 255 as well as the remainder documents 265. Model building module 210 can assign weights for each token based on whether the token occurs in each region. For example, a token occurs in a region including a selected portion of a training document receives a higher weight than a token that occurs in a region that includes non-selected portions of the training document. Model building module 210 can normalize the weights for each token to generate a token score. Model building module 210 can store the tokens, the weights, and the token score in marker text, such as marker text 270.

Model building module 210 builds a model based on the marker text. In one embodiment, the model is a support vector machine (SVM) built using the weights in marker text 270. Model building module 210 can apply a machine learning kernel to the training documents in training documents 255 and marker text 270, and select one or more parameters for the machine learning kernel to build the SVM engine.

Classification module 215 can obtain electronic discovery documents to be classified from remainder documents 265.

In one embodiment, classification module 215 generates a search query for each region of marker text 270. The marker text 270 can include tokens, a position of each token, and a classification for each token. Classification module 215 can determine a region of tokens using the positions of tokens and selecting a group of tokens whose positions are proximate to one another. For example, all the tokens in paragraph 2 may be selected. Classification module 215 can build a search query for each determined region of tokens. In some embodiments, the search query includes the tokens for the determined region of tokens. In some embodiments, the search query includes the tokens for the determined region of tokens as well as additional information to account for potential differences in appearance between the training document and the obtained electronic discovery documents, such as Boolean logic, proximity information, and fuzzy search information.

Classification module 215 can provide the search query and the obtained electronic discovery documents to be classified to the SVM engine for automatic suggestions for classification of the documents.

Presentation module 220 can present a user interface to an administrator or reviewer. The user interface can display one or more documents from training documents 255. Presentation module 220 can further provide a selection tool to allow the administrator or reviewer to select one or more portions of the displayed documents. In one embodiment, presentation module 220 provides the selected portions to training module 205. In one embodiment, presentation module 220 stores the selected portions in training documents 255.

Presentation module 220 can present one or more testing documents in testing documents 260 in the user interface, including one or more selected portions of the testing documents. In one embodiment, presentation module 220 allows the administrator or reviewer to update the selected portions of the testing documents to reflect whether the administrator or reviewer agrees with the selected portions. In this embodiment, presentation module 220 can update the training documents 255 based on the updates or can provide the updates to training module 205.

Presentation module 220 can receive a suggested classification for one or more documents in remainder documents 265 from classification module 215, and present the suggested classifications in a user interface. Presentation module 220 may further justify the suggested classifications by presenting selected exemplars and portions of previously marked text that most influenced the suggested classifications. Presentation module 220 can present the aspects, text, and/or attributes that contribute to a suggested classification such that the administrator or reviewer can see what contributed to the suggested classification provided by classification module 130.

Figure 3:
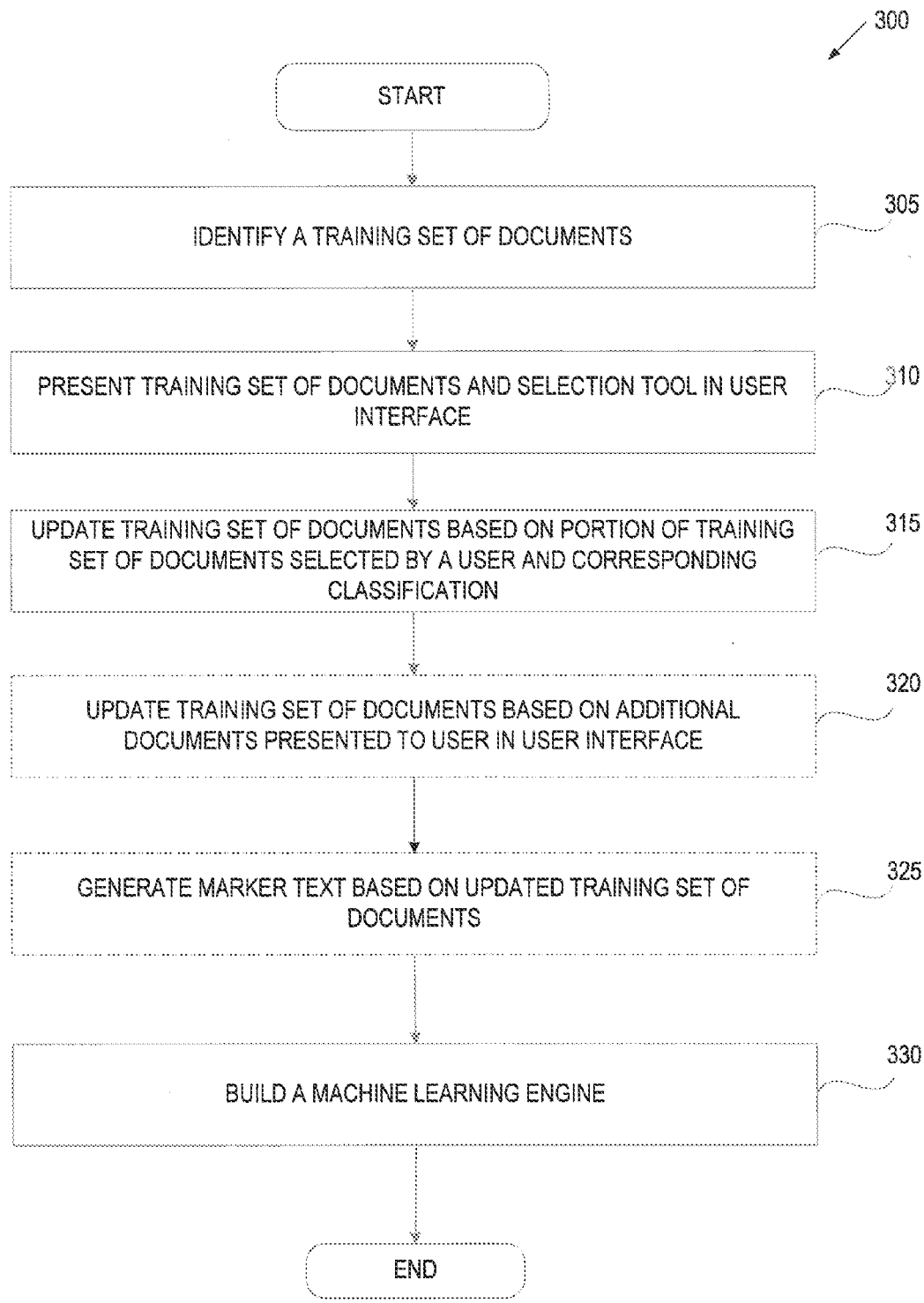
FIG. 3 is a flow diagram of an embodiment of a method for creating a machine learning engine, in accordance with an embodiment of the present invention.

FIG. 3 is a flow diagram of an embodiment of a method 300 for creating a machine learning engine. The method 300 is performed by processing logic that may comprise hardware (circuitry, dedicated logic, etc.), software (such as is run on a general purpose computer system or a dedicated machine), or a combination of both. In one embodiment, the method 300 is performed by the predictive coding system 110 of FIG. 1.

At block 305, processing logic identifies a training set of documents. The training set of documents can be a subset of electronic discovery documents that are selected for machine learning. In some embodiments, the training set of documents is selected by a user, such as a reviewer or a system administrator. In some embodiments, the training set of documents is selected randomly from the electronic discovery documents. In some embodiments, the number of documents in the training set of documents is a percentage of the total number of electronic discovery documents. For example, the training set of documents includes ten percent of the total number of electronic discovery documents. In some embodiments, the number of documents in the training set is based on the number and complexity of specific issues in a legal case to which the electronic discovery documents are related to. For example, a simple legal case with a relatively few issues may only require one hundred (100) documents in the training set. In another example, a complex legal case with many electronic discovery documents and many issues may require one hundred thousand (100,000) documents in the training set.

At block 310, processing logic presents the training set of documents and a selection tool in a user interface. Using the user interface, a user can input one or more portions of a document and a classification corresponding to the inputted portions. Examples of a selection tool and user interface are described in greater detail below in conjunction with FIGS. 6A-6D, according to some embodiments.

In one embodiment, the user can input one or more portions of a document and a classification corresponding to the inputted portions using a selection tool included in the user interface. The selection tool, also referred to as a "magic wand," or "highlighter," can be operated by the user to select the one or more portions of a document. In some embodiment, the user can highlight relevant text, passages, paragraphs, sections, document attributes, and/or document metadata to select the portion or portions of the document. In some embodiments, the user can select a portion or portions of a document by requesting a search of the document for one or more search terms and/or relevant text (e.g., using an input box provided in the user interface). In these embodiments, the text of paragraphs in the document containing the search term or relevant text is selected. In some embodiments, the user can select a portion or portions of a document by requesting a search of the document for one or search terms and a specific number of instances for each of the one or more search terms (e.g., using an input box provided in the user interface). In these embodiments, the text of paragraphs containing the specified number of instances of the one or more search terms is selected.

In order to minimize the effort needed to select text, the selection tool may offer the user the capability to mark a portion of a document using a positive marking or a negative marking. A portion of a document that is marked using a positive marking can indicate to the predictive coding system that the selected text needs to be considered as a positive contribution to the tag or class of the document. For example, marking a section of text in a document as "Export Agreement" indicates that the document is more responsive than other documents. A portion of a document that is marked using a negative marking can indicate to the predictive coding system that the selected text needs to be considered as a negative contribution to the tag or class of the document. A negative marking may therefore indicate that a document containing the selected text should not be marked with that tag or class. For example, marking a section of text in a document as "Investment Newsletter" indicates that the document is less likely to be responsive, and should therefore not be classified as responsive.

In one embodiment, the user can input one or more portions of a document and a classification corresponding to the inputted portions using an input entry tool included in the user interface. The input entry tool can allow the user to enter text (e.g., bullets, sentences, paragraphs, etc.) of text and/or attributes that were used in making the classification without selecting the text and/or attributes in a document.

In order to minimize the effort in creating training documents, not all documents need be marked with text selections. Documents without any selection can still be marked with a tag or class, and the entire text and metadata regions in the documents can be used for training.

The user interface can further include one or more classifications, tags, or codes. Examples of classifications, tags, or codes can include, but are not limited to, confidential, not confidential, relevant, not relevant, privileged, not privileged, responsive, not responsive, etc. In one embodiment, the user can select a classification by clicking on the classification in the user interface. In an alternate embodiment, the user can select a classification by highlighting the classification in the user interface. In one embodiment, the selected portion(s) of a document is associated with the selected classification by storing the classification with the selected portion(s). In an alternate embodiment, the unselected portion(s) of a document are associated with the selected classification by storing the classification with the unselected portion(s). In this embodiment, the user selects the portion(s) of a document that the user does not want to be associated with the classification, and processing logic associates the unselected portions with the selected classification.

At block 315, processing logic updates the training set of documents based on one or more portions of the training documents selected by a user and the corresponding classification for each portion. The processing logic may obtain the one or more portions and the corresponding classification from the selection tool provided in the user interface. A document may contain several independent sections marked as either positive or negative portions or regions by the user. Several documents in the set of training documents can be marked with positive and negative regions by the user. A portion of a document that is marked using a positive marking can indicate to the processing logic that the selected text needs to be considered as a positive contribution to the tag or class of the document. A positive marking may therefore indicate that a document containing the selected text should be marked with the corresponding classification. A portion of a document that is marked using a negative marking can indicate to the predictive coding system that the selected text needs to be considered as a negative contribution to the corresponding classification. A negative marking may therefore indicate that a document containing the selected text should not be marked with the corresponding classification.

In one embodiment, processing logic updates the training set of documents by creating a new training document including only the selected text and tags or classes and removing the previous training document from which the selected text was selected from. For example, a section of text in a first document marked as "Export Agreement" and a section of text in a second document marked as "Investment Newsletter" are copied into a new training document, and the first document and second document would be removed from the training set of documents. In alternate embodiment, processing logic updates the training set of documents by creating a new training document including only the selected text and tags or classes, and adding this new training document to the existing training set of documents. For example, a section of text in a first document marked as "Export Agreement" and a section of text in a second document marked as "Investment Newsletter" are copied into a new training document, and the first document and second document are also kept in the training set of documents.

At optional block 320, processing logic updates the training set of documents based on additional documents presented to the user in the user interface. In one embodiment, the additional documents presented to the user are selected by the processing logic by analyzing the electronic discovery documents outside of the training set of documents to determine whether any of the documents include one or more of the selected portions of the training set of documents. In this embodiment, the documents that include one or more of the selected portions can be additional documents.

In one embodiment, processing logic analyzes the electronic discovery documents outside the training documents to determine the documents that are near duplicates of a training document. In this embodiment, the documents that are near duplicates are additional documents to be presented. A near duplicate document is a document that is almost a duplicate of the training document (e.g., nearly identical). In one embodiment, to determine documents that are near duplicates of the training documents, processing logic submits the training documents and the electronic discovery documents to a near duplicate engine, and receives the near duplicate documents from the engine. In an alternate embodiment, to determine documents that are near duplicates of the training documents, processing logic evaluating each training document to determine whether any of the electronic discovery documents are similar to the training document. In this embodiment, processing logic can map the training documents into a feature vector space by extracting one or more features from each training document and assigning identifiers to the features in a feature vector. Once all of the training documents have been mapped to a feature vector, processing logic can send the feature vectors for the training documents to a near duplicate engine, and receive testing documents from the engine based on the feature vectors.

Processing logic can present the additional documents to the user in the user interface. Processing logic can further automatically select the portions of the additional documents that match the one or more of the selected portions, and can provide the automatically selected portions in the user interface. For example, a document Y is determined to be an additional document with a marking of "responsive" is determined to be an additional document to present in the user interface. The document Y, the "responsive" marking for the document Y, and a selection of text and/or attributes that contributed to the marking are presented in a user interface. Processing logic can present the "responsive" marking, as well as the portion(s) of document Y that influenced the marking.

Processing logic can obtain user input for the additional documents, and update the training set of documents based on the user input. In one embodiment, the user input includes additional selected portions and/or classifications for the additional documents. In one embodiment, the user input includes deselection or abandonment of the automatically selected portions of the additional documents and/or additional classifications. For example, if the user presented with document Y disagrees with the selection of text and/or attributes that contributed to the classification, the user can deselect those text and/or attributes that contributed to the classification. Processing logic can obtain the deselected text and/or attributes and update the training set of documents based on that deselection. In another example, if the user presented with document Y disagrees with the marking or classification for the document Y, the user can update the marking or classification. Processing logic can obtain the new marking or classification for the document Y and update the training set of documents based on the new marking or classification.

In one embodiment, processing logic updates the training set of documents by creating a new training document including only the selected text and tags or classes for the additional document. In alternate embodiment, processing logic updates the training set of documents by including the entire additional document in the training set of documents.

At optional block 325, processing logic generates marker text based on the updated training set of documents. In one embodiment, processing logic generates marker text also based on the electronic discovery documents outside of the training set of documents. Processing logic can generate the marker text by dividing each document into one or more regions, creating tokens for each region, and assigning a weight to each token.

Processing logic can divide each document into one or more regions. In one embodiment, each document is divided into positive regions, negative regions, and neutral regions. A positive region is a region of text or an attribute that is associated with a positive marking. A negative region is a region of text or an attribute that is associated with a negative marking. A neutral region is a region of text or an attribute that does not have a marking associated with it. Processing logic can divide each document into one or more regions by determining whether a marking is associated with the region. If a marking is associated with a region, the region is determined based on whether the marking is a positive marking or a negative marking. If a marking is not associated with a region, the region is determined to be a neutral region.

Once a document has been divided into one or more regions, processing logic analyzes the text in each region to create one or more tokens. Each token is a word or a string of text that is likely found as a unit in both the training documents as well as the rest of the documents.

Processing logic assigns each token a weight. In one embodiment, a higher weight is assigned to a token from a positive or negative region and a lower weight is assigned to a token from a neutral region. In this embodiment, by giving higher weights to tokens that were used by a user to give a classification will make these tokens more important when predicting classifications for unclassified documents. In one embodiment, the weight assigned to a token is assigned based on the number of times the token occurs. In some embodiments, the weight assigned to the token is based on the number of times the token occurs in a positive region and/or a negative region. Processing logic can normalize the weight for each token to generate a token score. Processing logic can store the tokens, the weights, and the token score in marker text.

At block 330, processing logic builds a machine learning engine. In one embodiment, processing logic builds the machine learning engine using the updated training set of documents. In an alternate embodiment, processing logic builds a machine learning engine using the marker text. Processing logic can build the machine learning engine by selecting a training model, machine learning kernel, and kernel parameters. For a complete description of a manner of selecting a training model, machine learning kernel, and kernel parameters, reference is made to application Ser. No. 13/421,226, which is hereby incorporated by reference.

In certain embodiments, processing logic continues to train the prediction coding system throughout the entire course of document review. In other embodiments, the prediction system trains itself based only on those documents identified as the training set.

Figure 4:
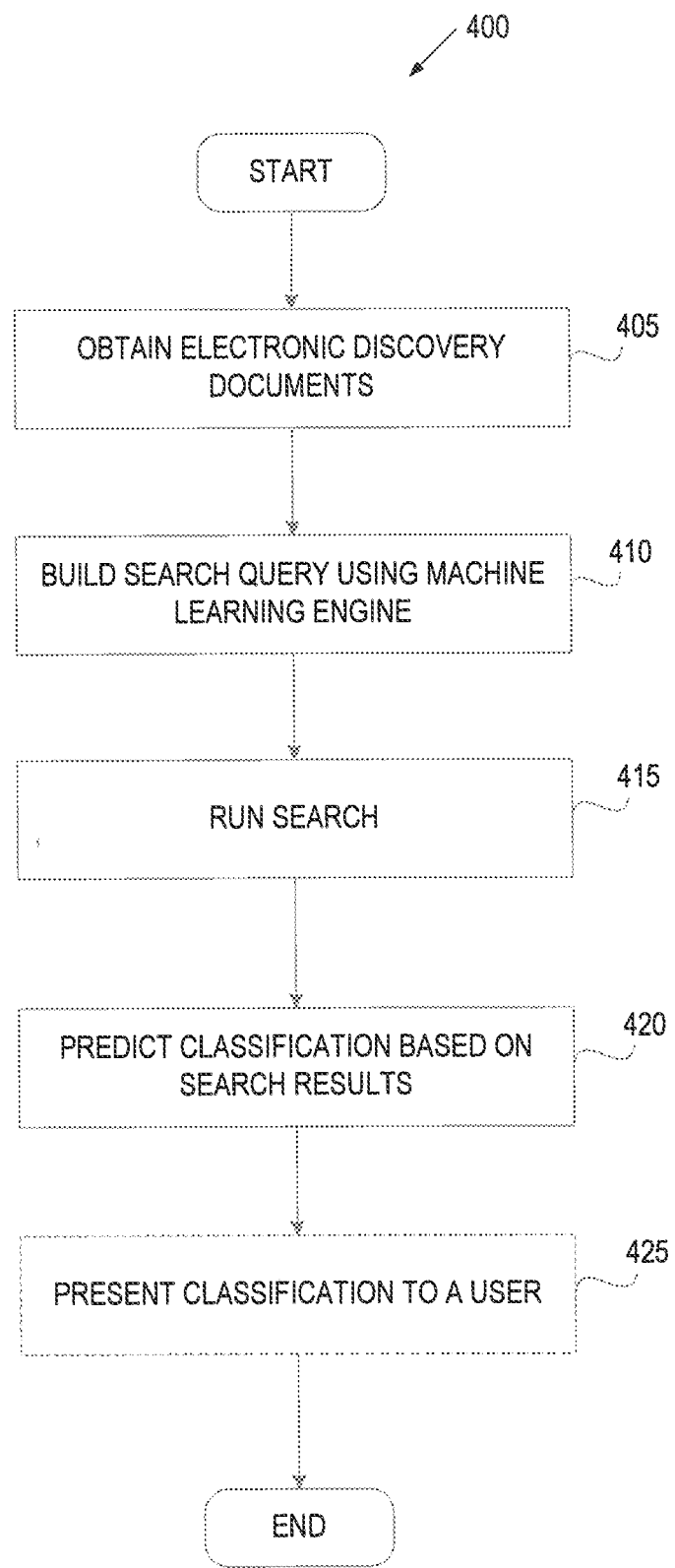
FIG. 4 is a flow diagram of an embodiment of a method for classifying documents using a machine learning engine, in accordance with an embodiment of the present invention.

FIG. 4 is a flow diagram of an embodiment of a method 400 for classifying documents using a machine learning engine. The method 400 is performed by processing logic that may comprise hardware (circuitry, dedicated logic, etc.), software (such as is run on a general purpose computer system or a dedicated machine), or a combination of both. In one embodiment, the method 400 is performed by the prediction coding system 110 of FIG. 1.

At block 405, processing logic obtains one or more electronic discovery documents. In one embodiment, the electronic discovery documents are documents that have not been classified for a legal review. In an alternate embodiment, the electronic discovery documents are documents that have been classified for a legal review and need to be reclassified. In one embodiment, processing logic obtains the electronic discovery documents by accessing a data store. In an alternate embodiment, processing logic obtains the electronic discovery documents by receiving the electronic discovery documents.

At block 410, processing logic builds a search query using a machine learning engine. In some embodiments, the machine learning engine may have been generated using documents from the same case or litigation as the obtained electronic discovery documents. In another embodiment, the machine learning engine may have been generated using documents from a different case or litigation as the obtained electronic discovery documents. In one embodiment, the search query is built using marker text in the machine learning engine. In one embodiment, the keywords included in the search query are the tokens of the marker text.

In some embodiments, the search query further accounts for a possibility of differences in appearance between a previously classified document and the current electronic discovery documents. In one such embodiment, the search query includes Boolean values, proximity information, position information, and fuzzy search information to account for the differences.

At block 415, processing logic performs a search on the electronic discovery documents using the search query. In some embodiments, the search is run using a fuzzy match to account for variations between the selected portions from training documents and text in the electronic discovery documents. A fuzzy match can be necessary since strict comparison criteria for presence of the selected portions of training documents may lead to a mismatch of the selected portions and could render the entire selection process useless. For example, if "Export Contract with certain countries" is marked as a positive region in one or more training documents, using a fuzzy match, processing logic may be able to match an electronic discovery document containing the paragraph "I reviewed several contracts regarding export of our product components to certain restricted countries." Facilitating this match is part of the text analysis and, in some embodiments, may employ an additional full-text search engine with a search index built for the purposes of keyword-based search. In one embodiment, the fuzzy match is performed by constructing a collection of phrase searches. In another embodiment, the fuzzy match is performed using a construction of a paragraph feature vector of training document regions and matching a neighborhood of other electronic discovery documents feature vectors.

At block 420, one or more classifications are predicted for each electronic discovery document based on the search results. In one embodiment, the search results returns a degree of similarity between the electronic discovery document and the search query. In one embodiment, a classification is predicted for an electronic document only if there is an exact match between the electronic discovery document and the search query. In an alternate embodiment, a classification is predicted for an electronic document if there is a partial match between the electronic discovery document and the search query. A "partial match" is text, a passage, and/or another attribute of the electronic discovery document having a specified degree of similarity with the search query. For example, a partial match has at least 50%, at least 55%, at least 60%, at least 65%, at least 70%, at least 75%, at least 80%, at least 85%, at least 90%, or at least 95% similarity with the search query. In another example, the partial match has less than 50% similarity with the search query. In some embodiments, upon identifying a partial match, processing logic assigns a weight, or a confidence level, to each of one or more predicted tags or codes based on the degree of similarity. The degree of similarity for a partial match can be provided by a user.

In one embodiment, the classification is predicted using a probability measure. Based on the search query, the classification of an electronic discovery document is assigned a probability measure. In one embodiment, the probability measure is a value between 0 and 1, with a probability value of zero indicating a definite mismatch to a probability value of one indicating a complete match. A classification for a document can be made based on whether the probability measure for a classification for the document is above a predetermined threshold. For example, if a classification of "responsive" for a document is above the predefined threshold of 0.5, the document is classified as "responsive." In other embodiments, other value ranges for the probability can be selected without departing from the scope of the invention.

At optional block 425, processing logic can present the classification identified for one or more of the electronic discovery documents to a user. In one embodiment, the classification for an electronic discovery document is presented as a suggestion in a document review panel interface. In some embodiments, the document review panel interface presents the user with the exemplar documents and one or more occurrences of the selected portions of those exemplar documents that contributed to the suggested classification. One embodiment of presenting the exemplar documents and the selected portions is further described below in conjunction with FIG. 5. In one embodiment, processing logic presents a navigation tool that can be used by the user to view the exemplar documents and can take the user to the aspects, text, and/or attributes that contributed to the suggested classification for an electronic discovery document.

In one embodiment, the document review panel interface allows the user to review and accept or reject the predicted codes. Code/tags that are "accepted" will be assigned to the document. Codes/tags that are "rejected" will not be assigned to the document. In an alternate embodiment, the classification is automatically assigned to the document. The document review panel interface may allow the user to review the codes/tags that were assigned. In some embodiments, the codes/tags can be rejected by the user and will not be assigned to the document. In some embodiments, if the user does not reject the code/tag, the code/tag will remain assigned to the document. An example of a document review panel interface is described in greater detail below in conjunction with FIG. 7, according to one embodiment.

Figure 5:
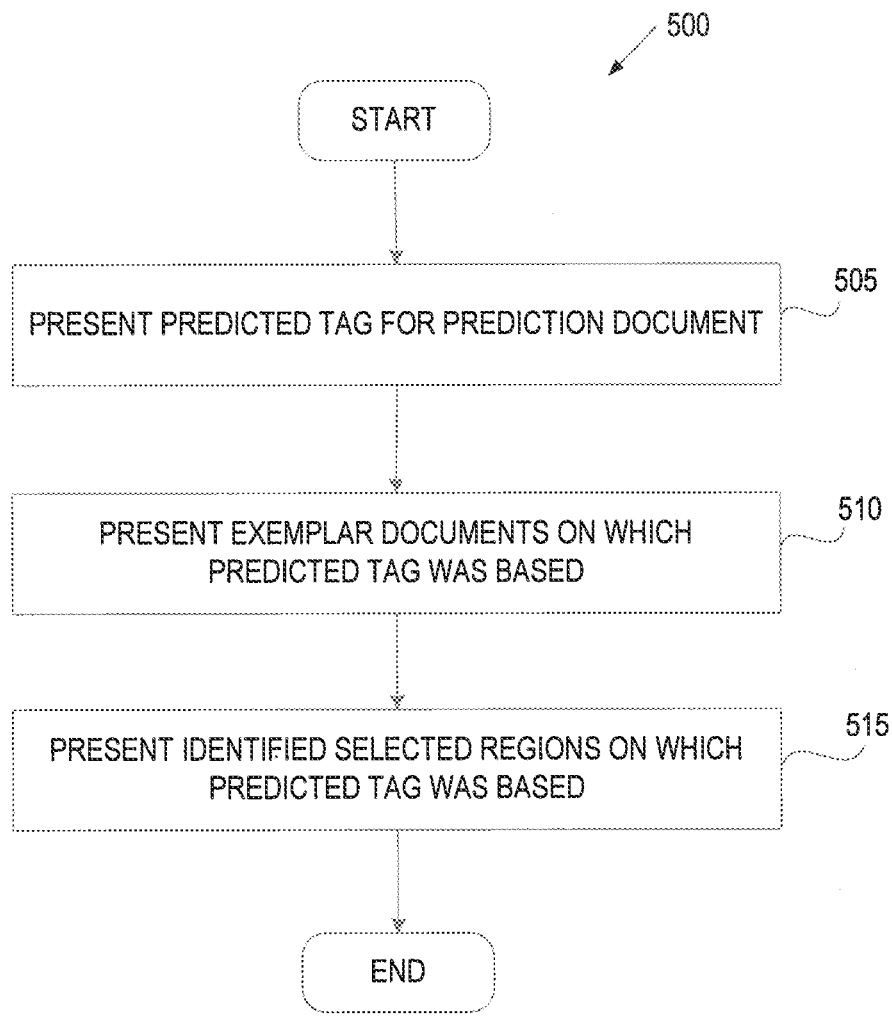
FIG. 5 is a flow diagram of an embodiment that presents exemplars and selected regions for a certain prediction, in accordance with an embodiment of the present invention.

FIG. 5 is a flow diagram of an embodiment of a method 500 for presentation of exemplars and selected portions. The method 500 is performed by processing logic that may comprise hardware (circuitry, dedicated logic, etc.), software (such as is run on a general purpose computer system or a dedicated machine), or a combination of both. In one embodiment, the method 500 is performed by the prediction coding system 110 of FIG. 1.

At block 505, processing logic presents the predicted tag for a prediction document. The prediction document can be an unclassified document in a set of electronic discovery documents to be classified by a predictive coding system. In one embodiment, the presented prediction document is selected by a user. In an alternate embodiment, the presented prediction document is automatically selected at random by the predictive coding system. In another alternate embodiment, the presented prediction document is selected in an a predetermined order. The predicted tag for the prediction document can be based on a classification determined by the predictive coding system, as described above in conjunction with FIG. 4. In one embodiment, processing logic presents the predicted tag for a prediction document is presented in a document review panel interface. An example of a document review panel interface is described in greater detail below in conjunction with FIGS. 7, 8A, and 8B, according to some embodiments.

At block 510, processing logic presents exemplar documents on which the predicted tag for the prediction document was based. In one embodiment, processing logic determines the exemplar documents by accessing the prediction document associated with the predicted tag, identifying the portions of the prediction document that were used to determine the predicted tag, and determining the training documents associated with the identified portions. In this embodiment, the determined training documents are presented as the exemplar documents on which the predicted tag was based. In an alternate embodiment, processing logic determines the exemplar documents by accessing information associated with the prediction document that includes, for each prediction document, the training documents on which the predicted tag was based. This information can be based on the search results used to create the predicted tag or classification. In one embodiment, processing logic presents the exemplar documents in a document review panel interface. In an alternate embodiment, processing logic presents the exemplar documents in a user interface different than the document review panel interface.

At block 515, processing logic presents identified selected regions on which the predicted tag was based. In some embodiments, the selected text is from the exemplar training set documents. In some embodiments, the selected text is from the prediction document that was provided for classification. In certain embodiments, the system provides selected text from both the prediction document and the exemplar documents. In one embodiment, processing logic determines the identified selected regions of the exemplar documents based on the search results used to create the predicted tag or classification. In an alternate embodiment, processing logic determines the identified selected regions by accessing tags associated with the exemplar documents and determining text associated with the tag in the exemplar document.

Selected text is identified because it represents an overlap or similarity between the exemplar training set documents and the prediction document, thus being relevant to a particular coding suggestion. It enables the user to quickly understand the reasoning behind a particular suggestion, and to quickly decide whether to accept or reject a coding suggestion provided by the system.

Figure 6A:
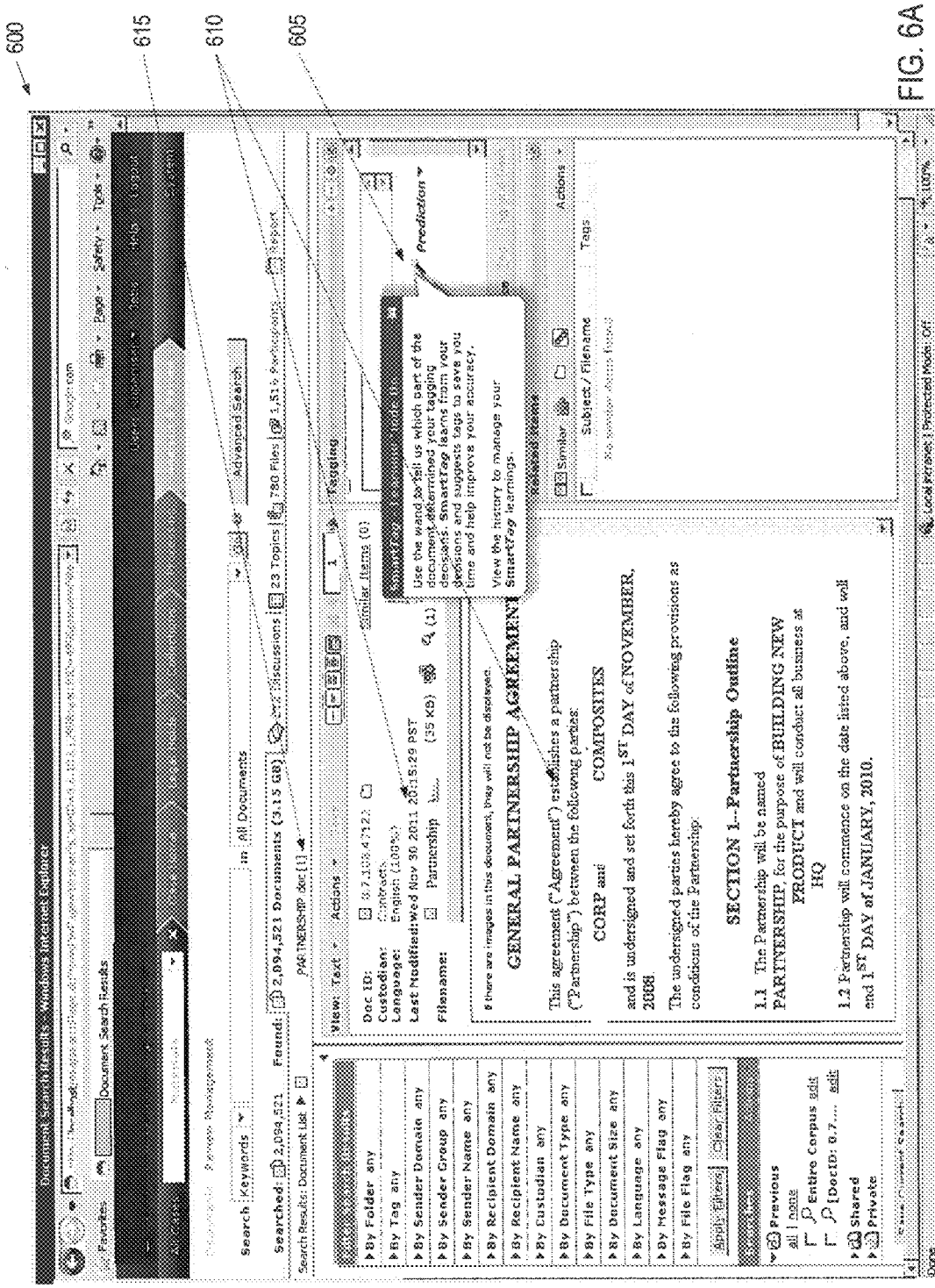

FIG. 6A is an exemplary user interface 600 presented to a user reviewing a set of training documents. In one embodiment, the user interface 600 includes selection tool 605. In some embodiments, selection tool 605 is referred to as "SmartTag" or a "magic wand." When a user clicks on selection tool 605, the selection tool 605 changes a cursor used by the user to allow the user to select one or more portions 610 of a training document 615.

Figure 6B:
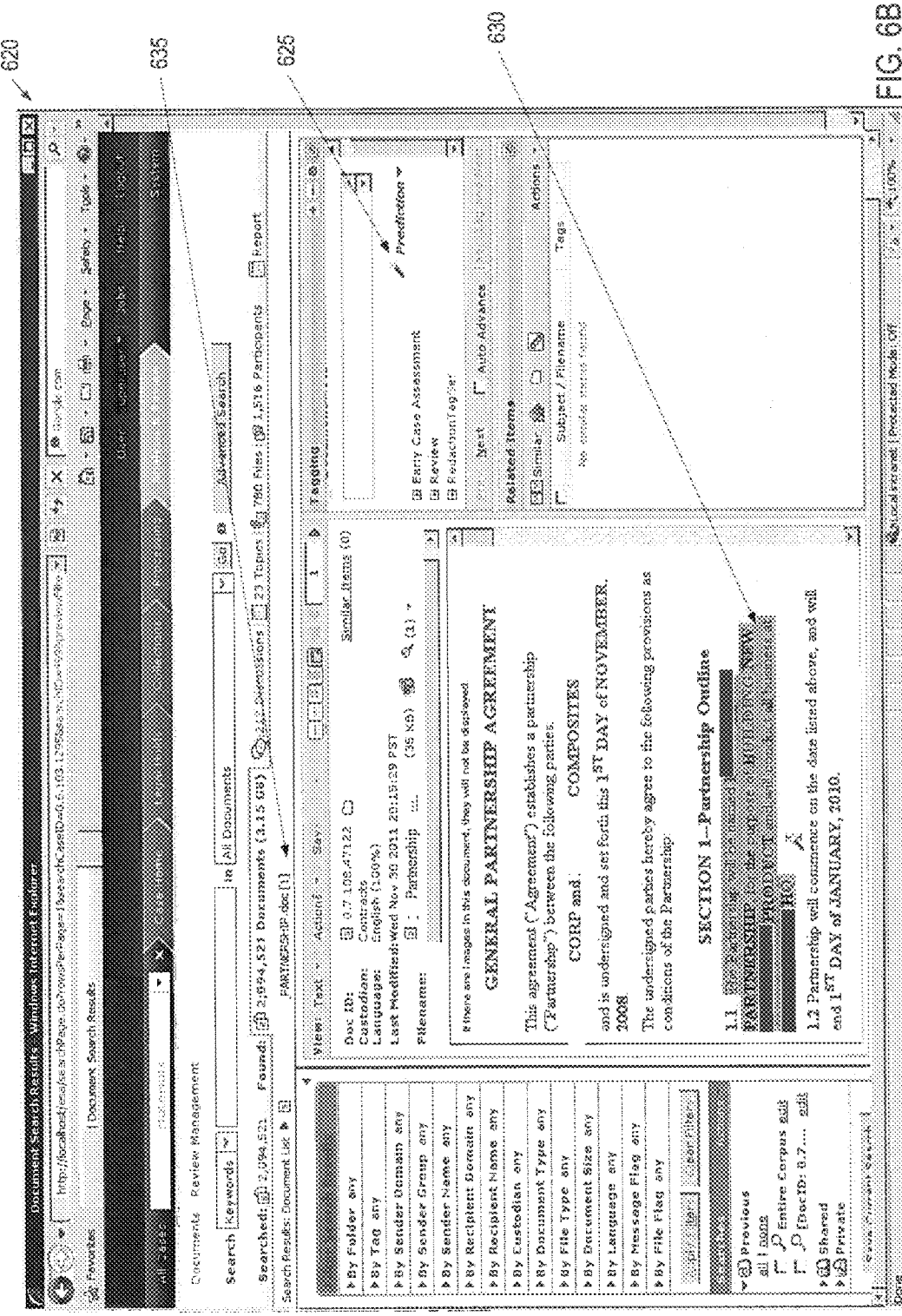

FIG. 6B is an exemplary user interface 620 presented to a user reviewing a set of training documents. In one embodiment, the user interface 620 includes selection tool 625. The selection tool 625 is used to highlight or select a portion 630 of a training document 635.

Figure 6C:
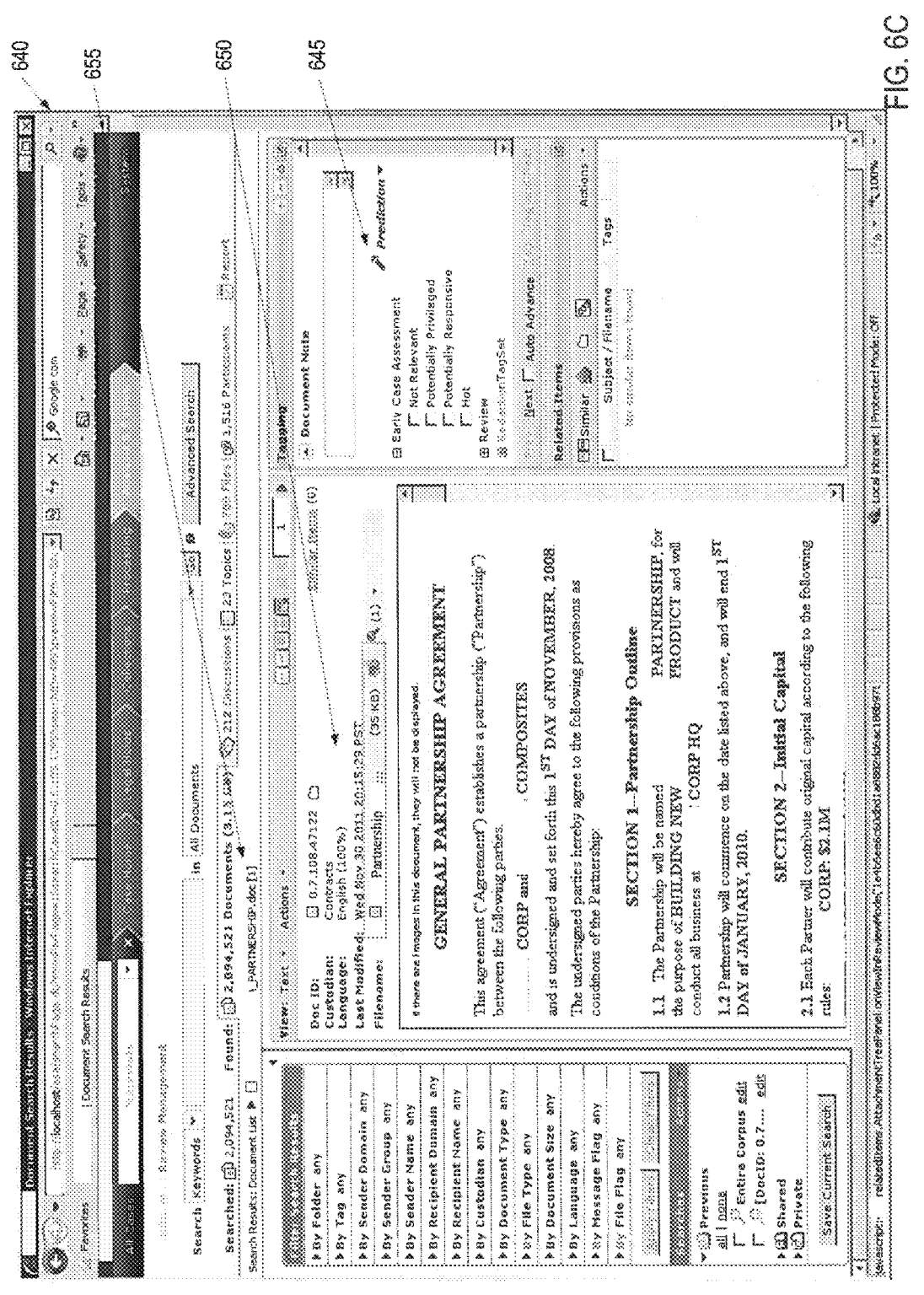

FIG. 6C is an exemplary user interface 640 presented to a user reviewing a set of training documents. In one embodiment, the user interface 640 includes selection tool 645. The selection tool 645 is used to highlight or select a header field 650 with one click of a training document 655.

Figure 6D:
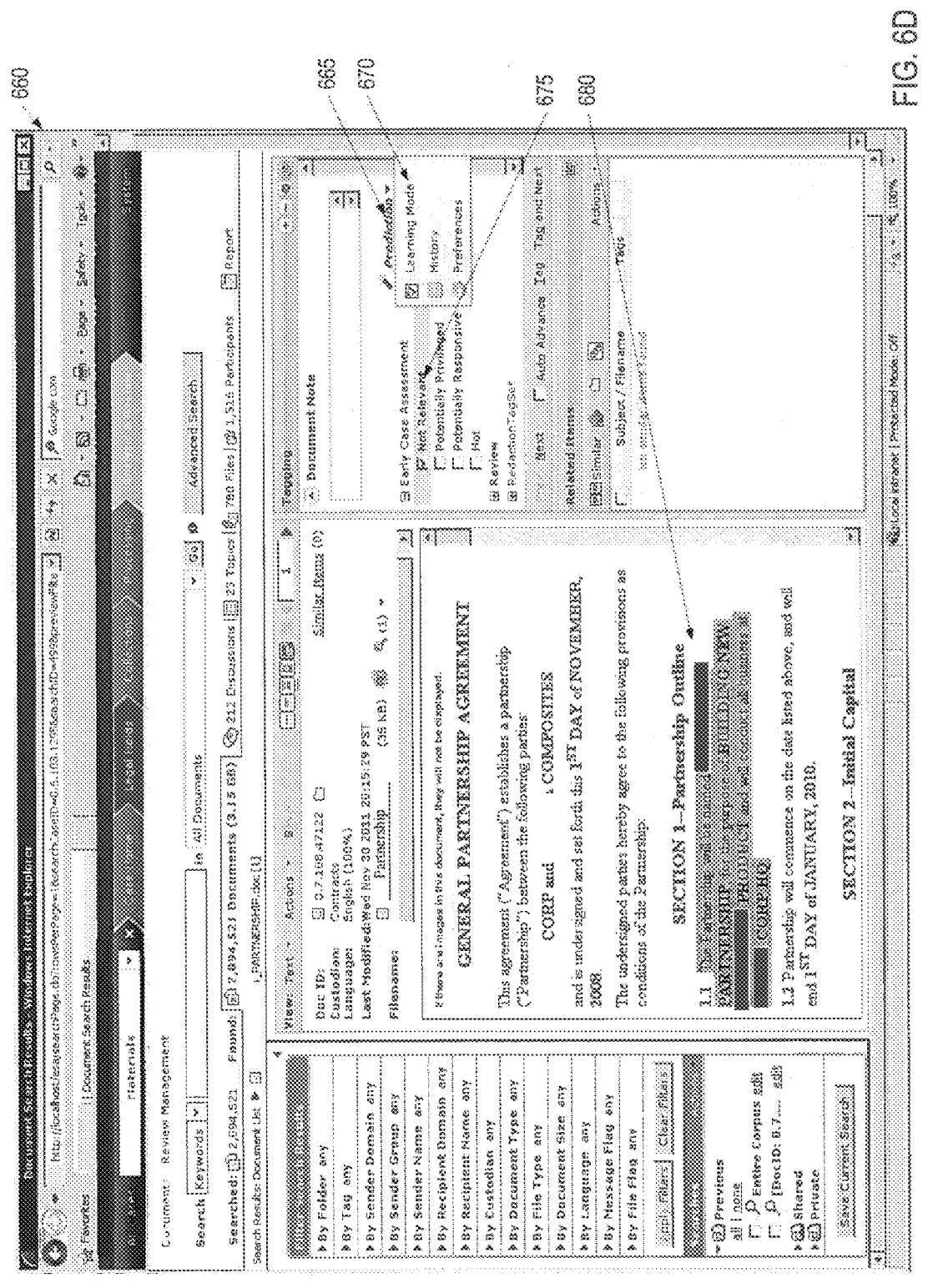

FIG. 6D is an exemplary user interface 660 presented to a user reviewing a set of training documents. In one embodiment, the user interface 660 includes selection tool 665. The selection tool 665 includes a learning mode 670 that can be enabled to instruct the predictive coding system to associate the selected tag 675 with the document text 680. In some embodiments, the document text 680 can be considered more important, and, in some embodiments, the only significant text.

Figure 7:
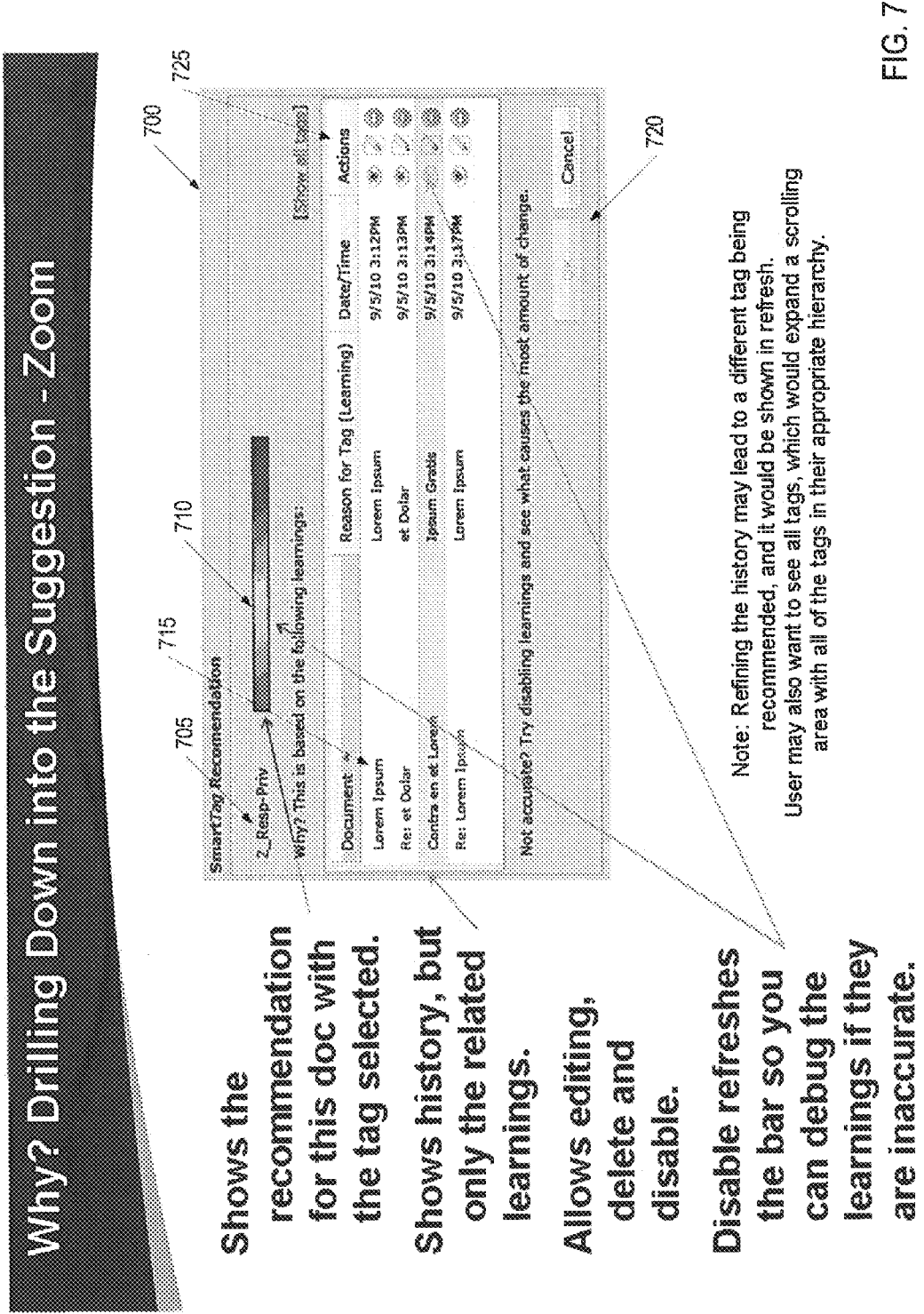
FIG. 7 is an exemplary interface for providing tag suggestions to the user, according to one embodiment.

FIG. 7 is an exemplary user interface 700 for providing tag suggestions to the user by a predictive coding system. The predictive coding system displays a recommended tag or classification 705. A confidence bar or another indicator 710 can be presented to visually demonstrate how close the document matches with the exemplars documents 715. The predictive coding system can also provide a listing of the exemplars documents 715 on which the system based its recommendation. To enhance ability to learn, the user may disable one or more of the exemplar documents 715 and refresh the confidence bar using an interactive button, such as button 720. Button 720 can cause the predictive coding system to refresh the exemplar documents 715 and to display an updated confidence bar or other indicator 710 to see an updated indication of how close the document matches the updated exemplar documents 715.

Using actions 725, a user may, for example, view the relevant text from the exemplar documents 715, remove an exemplar document from being correlated with the particular tag, and/or select further text from one or more of the exemplar documents 715 that should be considered relevant in the coding suggestion process. Once the user has carried out these additional actions, the recommended tag or classification 705 can be refreshed to reflect the updated criteria and history. In some embodiments, interface 700 can display all recommended tags for a document, allowing the user to expand a scrolling area showing all of the tags in their appropriate hierarchy.

Figure 8A:
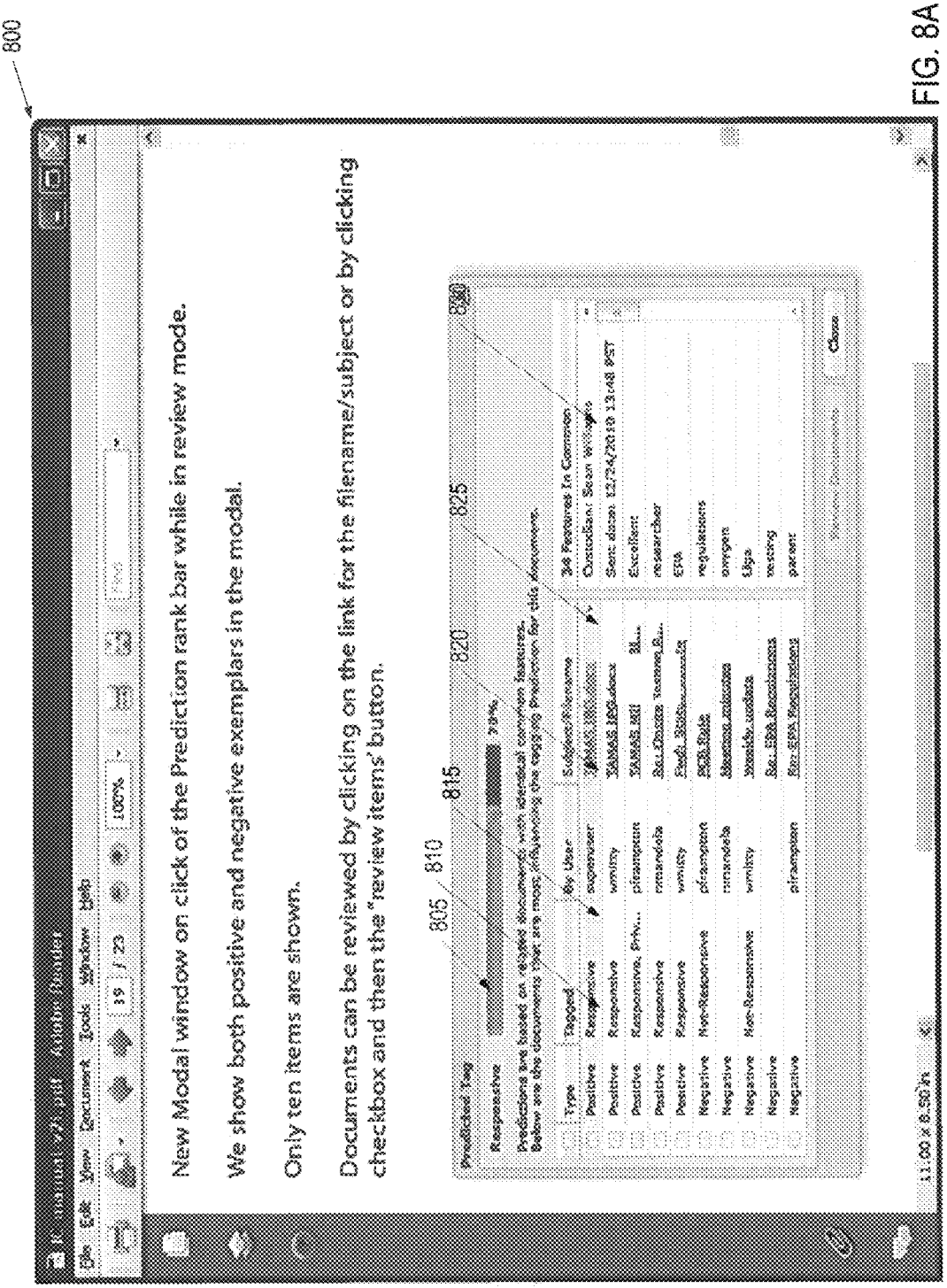
FIGS. 8A-8B are exemplary user interfaces identifying exemplars for certain predictions, according to some embodiments.

FIG. 8A is an exemplary user interface 800 that demonstrate the transparency of the predictive coding system. In user interface 800, a predicted classification or tag 805 is presented to a user. The user interface 800 further includes document information that directly affects a prediction classification or tag 805, such as a type 810 of identified selected regions used in determining the predicted classification or tag 805, a tag associated with the identified selected regions 815, a user 820, a filename or subject 825 of exemplar documents used in determining the predicted classification or tag 805, and features 830 of the identified selected regions. Therefore, a user can understand both the reasoning behind a particular tag suggestion and the confidence level/responsiveness of a particular tag. Tag suggestions can be displayed in order of descending confidence level.

Figure 8B:
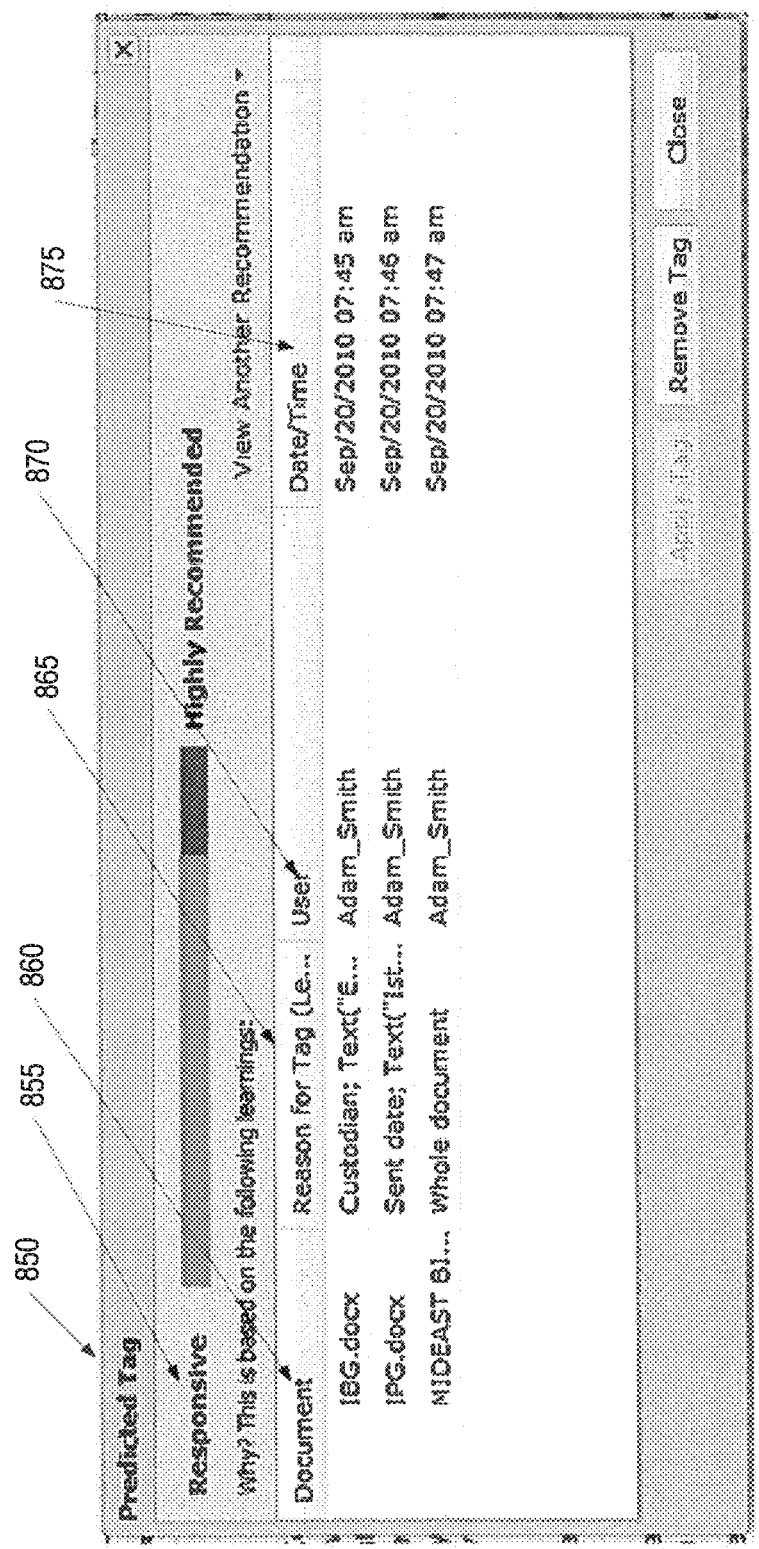

FIG. 8B is an exemplary user interface 850 that demonstrate the transparency of the predictive coding system. In user interface 850, a predicted classification or tag 855 is presented to a user. The user interface 850 further includes document information that directly affects a prediction classification or tag 855, such as one or more exemplar documents 860 used in determining the predicted classification or tag 855, reasons for the tag 865 (such as the portions and/or text used in determining the tag 855), a user 870, and a date/time 875. Therefore, a user can understand both the reasoning behind a particular tag suggestion and the confidence level/responsiveness of a particular tag. Tag suggestions can be displayed in order of descending confidence level.

Figure 9:
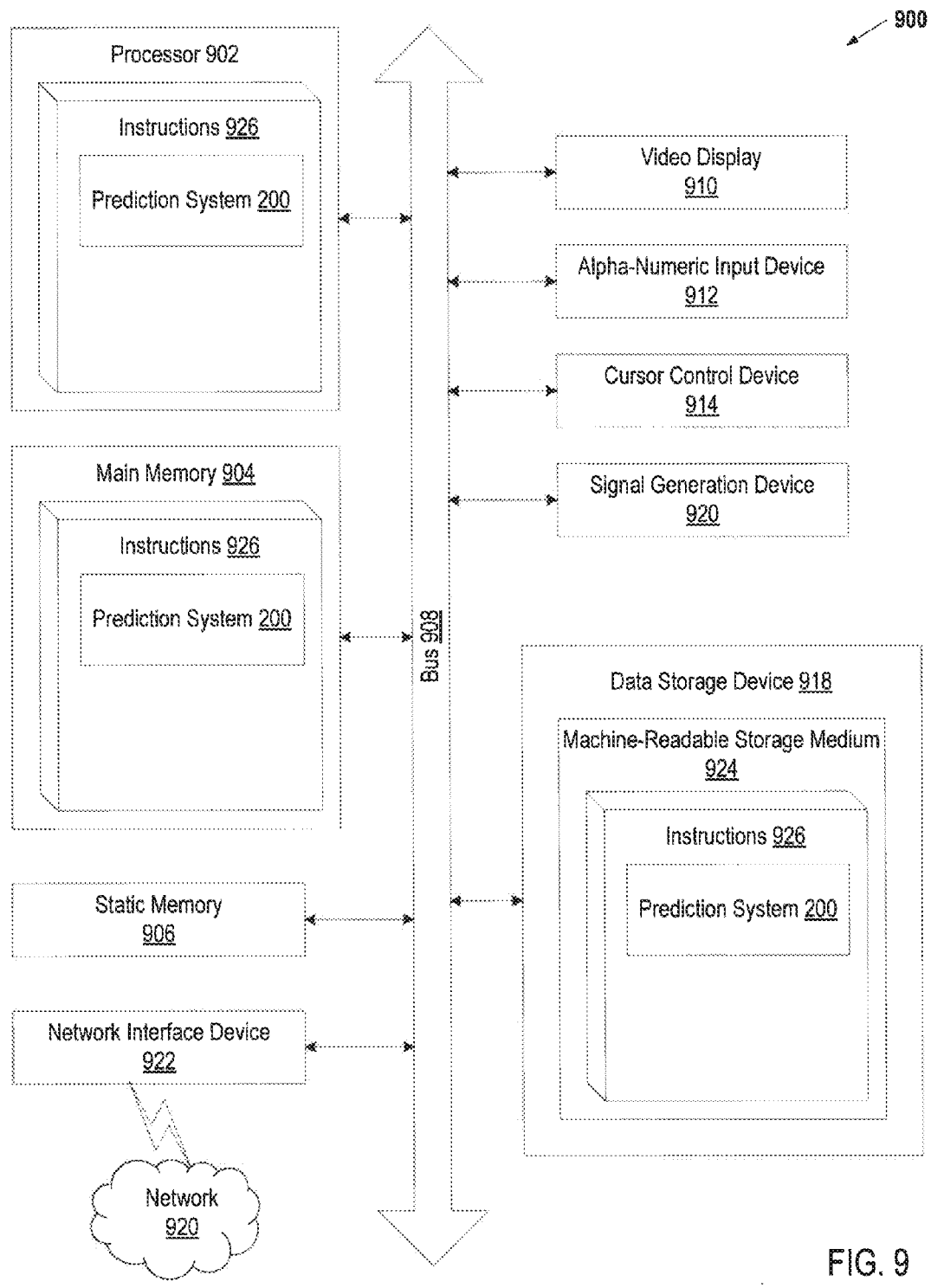
FIG. 9 is a block diagram of an exemplary computer system that may perform one or more of the operations described herein.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 902 during execution thereof by the computer system 900, the main memory 904 and the processor 902 also constituting computer-readable storage media. The instructions 926 may further be transmitted or received over a network 920 via the network interface device 922.

In one embodiment, the instructions 926 include instructions for a workload balancing module 200, and/or a software library containing methods that call an object detection/recognition engine. While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    updating, by a predictive coding system, a set of training documents based on a selected portion of a training document of the set to obtain an updated set of training documents;
    searching, by the predictive coding system, content within other training documents in the updated set using a machine learning engine based on the selected portion and variations of the selected portion;
    determining a probability measure for the content; and
    classifying, by the predictive coding system, a second training document containing the content based on the probability measure.

2. The method of claim 1, further comprising:
    presenting the set of training documents in a graphical user interface (GUI) of a selection tool;
    receiving, by the selection tool, a selection of the selected portion of the training document and a training classification; and
    associating the training classification with the selected portion of the training document.

3. The method of claim 2, wherein updating the set of training documents comprises:
    creating a new training document comprising the selected portion of the training document;
    associating the training classification with the new training document; and
    including the new training document in the updated set of training documents.

4. The method of claim 2, further comprising:
receive a marking from the selection tool;
determine that the selected portion of the training document is a positive contribution to the training classification when the marking is positive; and
determine that the selected portion of the training document is a negative contribution to the training classification when the marking is negative.

5. The method of claim 1, further comprising:
identifying additional documents to add to the updated set;
receiving input for the additional documents; and
modifying the updated set of training documents to include at least one of the additional documents based on the received input associated with the additional documents.

6. The method of claim 1, further comprising:
identifying one or more exemplar documents used by the predictive coding system to classify a prediction document in the updated set of updated training documents; and
identifying a region of the prediction document used by the predictive coding system to determine the classification for the prediction document in the updated set of training documents.

7. A non-transitory computer readable storage medium having instructions that, when executed by a processing device, cause the processing device to perform operations comprising:
updating a set of training documents based on a selected portion of a training document of the set to obtain an updated set of training documents;
searching content within other training documents in the updated set using a machine learning engine based on the selected portion and variations of the selected portion;
determining a probability measure of the content; and
classifying a second training document containing the content based on the probability measure.

8. The non-transitory computer readable storage medium of claim 7, further comprising:
presenting the set of training documents in a graphical user interface (GUI) of a selection tool;
receiving, by the selection tool, a selection of a portion of the training document and a training classification; and
associating the training classification with the portion of the training document.

9. The non-transitory computer readable storage medium of claim 8, further comprising:
creating a new training document comprising the selected portion of the training document;
associating the training classification with the new training document; and
including the new training document in the updated set of training documents.

10. The non-transitory computer readable storage medium of claim 8, further comprising:
receiving a marking from the selection tool;
determining that the selected portion of the training document is a positive contribution to the training classification when the marking is positive; and
determining that the selected portion of the training document is a negative contribution to the training classification when the marking is negative.

11. The non-transitory computer readable storage medium of claim 7, further comprising:
identifying additional documents to add to the updated set;
receiving input for the additional documents; and
modifying the updated set of training documents to include at least one of the additional documents based on the received input associated with the additional documents.

12. The non-transitory computer readable storage medium of claim 7, further comprising:
identifying one or more exemplar documents used by a predictive coding system to classify a prediction document in the updated set of training documents; and
identifying a region of the prediction document used by the predictive coding system to determine the classification for the prediction document in the updated set of training documents.

13. A system comprising:
a memory; and
a processing device coupled to the memory, wherein the processing device is configured to:
update a set of training documents based on a selected portion of a training document of the set to obtain an updated set of training documents;
search content within other training documents in the updated set using a machine learning engine based on the selected portion and variations of the selected portion; and
determine a probability measure of the content; and
classify a second training document containing the content based on the probability measure.

14. The system of claim 13, wherein the processing device is further configured to:
present the set of training documents in a graphical user interface (GUI) of a selection tool;
receive, by the selection tool, a content selection of a portion of the training document and a training classification; and
associate the training classification with the portion of the training document.

15. The system of claim 14, wherein the processing device is further configured to:
create a new training document comprising the selected portion of the training document;
associate the training classification with the new training document; and
include the new training document in the updated set of training documents.

16. The system of claim 14, further comprising:
receive a marking from the selection tool;
determine that the selected portion of the training document is a positive contribution to the training classification when the marking is positive; and
determine that the selected portion of the training document is a negative contribution to the training classification when the marking is negative.

17. The system of claim 13, wherein the processing device is further configured to:
identify additional documents to add to the updated set;
receive input for the additional documents; and
modify the updated set of training documents to include at least one of the additional documents based on the received input associated with the additional documents.

18. The system of claim 13, wherein the processing device is further configured to:
identifying one or more exemplar documents used by a predictive coding system to classify a prediction document in the updated set of updated training documents; and
identifying a region of the prediction document used by the predictive coding system to determine the classification for the prediction document in the updates set of the updated training documents.

* * * * *